United States Patent [19]

McMillan, Jr.

[11] Patent Number: 4,467,660
[45] Date of Patent: Aug. 28, 1984

[54] TURBINE WHEEL FLOW MEASURING TRANSDUCER

[76] Inventor: Robert D. McMillan, Jr., 907 Shepherd Rd., Georgetown, Tex. 78626

[21] Appl. No.: 362,889

[22] Filed: Mar. 29, 1982

[51] Int. Cl.³ .............................................. G01F 1/06
[52] U.S. Cl. ................................ 73/861.87; 73/861.77
[58] Field of Search ........... 73/861.77, 861.87, 861.88, 73/861.33, 861.79; 128/726

[56] References Cited

U.S. PATENT DOCUMENTS

| | | |
|---|---|---|
| 400,331 | 3/1889 | Graeser . |
| 413,865 | 10/1889 | Paine .................................. 73/861.88 |
| 711,697 | 10/1902 | Donne .................................. 128/726 |
| 1,946,275 | 2/1934 | Collins ........................... 73/861.87 X |
| 2,243,252 | 5/1941 | Huxford et al. .............. 73/861.87 X |
| 2,525,914 | 10/1950 | Knauth ............................. 73/861.77 |
| 3,021,710 | 2/1962 | Barrere et al. . |
| 3,217,539 | 11/1965 | Owen et al. . |
| 3,230,767 | 1/1966 | Heigl et al. .................... 73/861.77 X |
| 3,701,277 | 10/1972 | McMahon et al. . |
| 3,788,285 | 1/1974 | Gelin et al. . |
| 3,792,610 | 2/1974 | Kountanis et al. . |
| 3,866,469 | 2/1975 | Wemyss . |
| 3,867,840 | 2/1975 | Baatz . |
| 3,949,606 | 4/1976 | Blancett . |
| 4,011,757 | 3/1977 | Baatz . |
| 4,023,410 | 5/1977 | Althaus . |
| 4,030,357 | 6/1977 | Wemyss . |
| 4,172,381 | 10/1979 | Aigner . |
| 4,195,522 | 4/1980 | Anderson et al. ............... 73/861.79 |

FOREIGN PATENT DOCUMENTS

| | | | |
|---|---|---|---|
| 2502599 | 7/1976 | Fed. Rep. of Germany ... | 73/861.79 |
| 2074724 | 11/1981 | United Kingdom ............. | 73/861.77 |
| 503149 | 4/1976 | U.S.S.R. ........................... | 73/861.79 |

OTHER PUBLICATIONS

Thomas, Carl C., The Journal of the Franklin Institute, vol. 172, No. 5, Nov. 1911, "The Measurement of Gases", pp. 411-460.
Goodyear, Robert S., Electrical Manufacturing, Oct. 1956, "Industrial Thermistor Applications", pp. 90-96.
Norton, Harry N., Handbook of Transducers for Electronic Measuring Systems, pp. 229-232, 1969.

Primary Examiner—Charles A. Ruehl
Attorney, Agent, or Firm—Pravel, Gambrell, Hewitt, Kirk & Kimball

[57] ABSTRACT

A turbine wheel flow measuring transducer having a reaction turbine wheel measures low flow rates of a gas. A disk (D) is rotatably mounted in a chamber (C) formed within a housing (H) through which the gas to be measured passes through a nozzle assembly (N). Plural teeth (T) are formed around the periphery of disk (D) for receiving the impact of the gas from nozzle assembly (N). A photoelectric circuit (P) directs light onto side portions of disk (D) to measure the relative movement of disk (D) in response to the impact of the gas against teeth (T).

18 Claims, 11 Drawing Figures

TURBINE WHEEL FLOW MEASURING TRANSDUCER

BACKGROUND OF THE INVENTION a. Field of the Invention

This invention relates to turbine wheel flow measuring transducers and, more specifically, to flow meters that measure low rates of a gaseous flow.

b. Description of the Prior Art

Conventional flow tube type gas flowmeters took the form of a vertically mounted glass tube containing a spherically shaped ball float that moved upward in the glass tube in proportion to the flow rate of the gas flowing through the glass tube. Such flow tube type flowmeters have historically been employed in various gas analyzers, gas metering devices and gas chromatographs. It is considered to be an advantage to have an economically priced flow sensor that produces an electrical signal in proportion to the flow rate as a suitable alternate for glass tube flowmeters but such a device is not currently being routinely employed, so far as is known, perhaps due to the price of commercially available electronic flow sensors.

A great majority of instrument related gas flow measurement applications call for very low gas flow rates to be measured. The majority of all such flow rate requirements was within the 100 to 1000 milliliter range with almost all falling within the 20 to 10,000 milliliter/minute flow range. Accordingly, a gas flow meter having the following characteristics would be highly desirable: inexpensive to construct; simple and reliable design; capable of measuring flow rates from 20 ml/minute to 10,000 ml/minute; having a very low pressure drop across the flow transducer; linear electrical output directly proportional to the flow rates; and small in size.

Currently, commercial gas flow transducers that are popular and used in a limited sense in the instrument industry are of two principal types: thermal sensors and axial turbine flow sensors. Typical small quantity costs of these sensors are such that manufacturers of gas instruments continue to use conventional flow tube type flow meters for the great majority of applications.

The thermal method is quite old and was first described by C. C. Thomas in the JOURNAL OF THE FRANKLIN INSTITUTE, 172,411 in 1911. Then, later an improved thermal flow sensing method using matched thermistors was described by R. S. Goodyear in the publication ELECTRICAL MANUFACTURING on page 90 in October 1956. It is this matched thermistor pair design that is in current usage by commercially available thermal sensing flow transducer manufacturers. However, hand matching of the thermistors is required for proper results and costs are high.

The axial flow turbine type flow transducer (Norton in HANDBOOK OF TRANSDUCERS FOR ELECTRONIC MEASURING SYSTEMS, first published in 1969) was originally developed for aerospace flow measurements but has since become popular in numerous other fields. The typical turbine rotor resembles a propeller blade suspended inside a tube so that as a gas flow moves through the tube, the turbine rotor spins in proportion to flow rate. Bearing friction becomes a paramount problem whenever gas flows below 1000 ml/minute are to be measured. So, as sensitivity for this type of turbine gas flow meter increases, then the costs related to construction to overcome frictional problems accordingly also increased since rotor blade balancing problems were accomplished by tedious hand methods.

Other conventional flow meters have taken the form of paddle wheel designs of the classical Pelton wheel turbine class having large impact surface areas. Examples of such large impact surface area turbine wheels are disclosed in U.S. Pat. Nos. 4,030,357; 3,866,469; 3,021,170; 4,011,757; 3,867,840; 400,331; 4,172,381; 3,792,610; 3,949,606; 4,023,410; and 3,701,277. A review of this prior art has disclosed that much attention has been given to turbine wheel or paddle wheel designs wherein liquid flows are to be measured. These paddle wheel designs were typically fabricated in sensitive versions using a plastic that provided a specific gravity approximately equal to that of the liquid being measured. This was of great benefit in liquid flowmeters because even though the turbine wheel was quite heavy, it floated in the liquid being measured, thereby removing the weight of the turbine wheel from its bearings and substantially reducing friction problems. Since all liquids are quite viscous in comparison to gases at usual conditions, Pelton wheel turbines could have only so many paddles or the liquid being measured could be so viscous that an unacceptable drag upon the turbine wheel was produced at high flow rates, causing the sensor to produce a non-linear electrical output.

The prior art turbine wheels tended to float in a liquid being measured and thereby removed at least some of the load of the weight of the turbine wheel from its bearings and tended to reduce frictional problems, as discussed above. However, with a gas, particularly at low velocity, the frictional resistance of paddle wheels rendered them unsuitable to measure gas flow. Also, due to the greatly reduced specific gravity of gases, the buoyant benefits available in a liquid flow meter were not available in a gas flow meter.

U.S. Pat. Nos. 3,788,285 and 3,217,539 disclosed propeller-shaped rotors in flow rate sensors, rather than paddle wheels. Photoelectric circuits were used to detect flow rate based on the rotation of these rotors, as sensed by light reflected off them. Due to their shape, however, these rotors were limited in area of light reflective surface available for use and were further not suited for very low gas flow rate measurements.

SUMMARY OF THE INVENTION

Briefly, the present invention includes an apparatus for measuring low flow rates of gas. A very thin, small diameter disk is rotatably mounted in a chamber within a housing through which the gas to be measured passes. Plural small reaction turbine blades or teeth are formed around the periphery of the disk for receiving substantially constant impact of the gas entering the chamber. A nozzle inlet means mounted in the housing directs the gas entering the chamber against the teeth on the disk, causing the rotation of the disk. A photoelectric circuit directs light onto side portions of the disk to measure the relative movement of the disk in response to the impact of the gas against the reaction turbine blades on the disk. The disk has reflective surfaces formed on the side portions for reflecting the light directed from the photoelectric circuit so that light reflected may be photoelectrically detected and an electrical measure of the gas flow rate formed.

The present invention provides a reaction turbine wheel which is sufficiently sensitive to rotate with gas flow rates for air at low flow rates, such as, as low as 20 ml/minute, and possibly lower. It has been found with the present invention that the impact torque imposed upon the turbine wheel by the gas must exceed the frictional counteractive torque caused by the weight of the turbine wheel assembly resting upon the shaft bearing supports, for flow rates at this low level to be measured.

Amont other factors Applicant found to be important when gases are to be measured by a flow sensor at low flow rate are determining the greatest impulse force delivered from the gas flow to the reaction turbine blades at the lowest flow rate to be measured, locating the turbine blades on a large outer radius of the wheel to provide the greatest torque to the turbine wheel from the impulse force generated by the gas flow; and also at the same time, keeping the turbine wheel at the lowest possible weight in order to minimize the bearing frictional counteractive torque. Further, to minimize the need for accurate balancing of the turbine wheel, it has been determined that the horizontal rotation of the wheel about a vertical axis is to be preferred.

DESCRIPTION OF THE PREFERRED EMBODIMENT

INTRODUCTION

Figure 1:
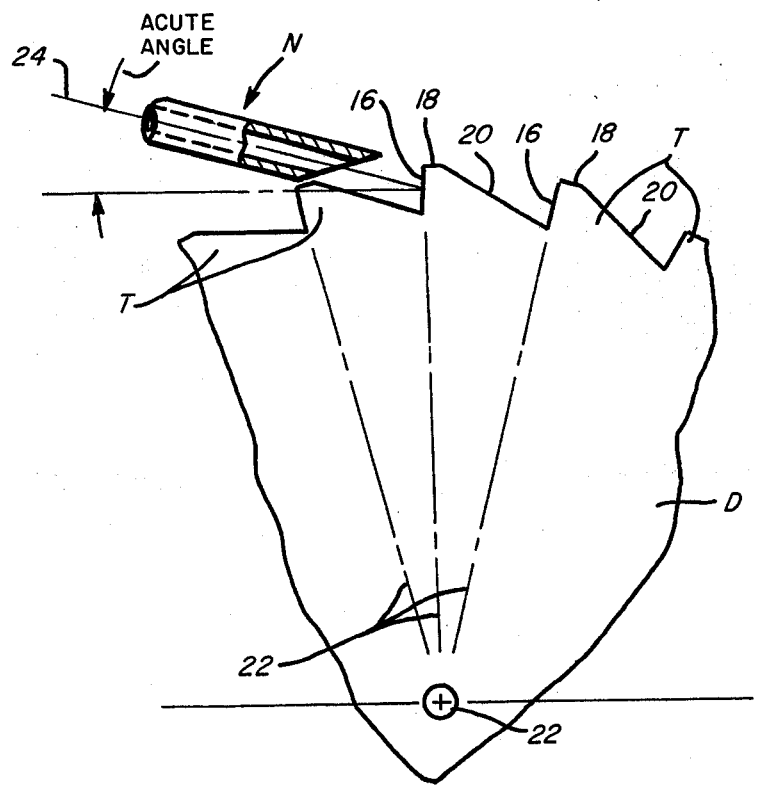
FIGS. 1, 1A, 1B and 1C are views of portions, in slightly different positions with respect to each other, of a disk and nozzle used in the apparatus of the present invention.

In the drawings, an apparatus A according to the present invention is set forth. The apparatus A of the present invention is particularly adapted for measuring low flow rates, such as on the order of 20 ml/minute, of a gas. The apparatus A is also adapted to measure low gas flow rates at low pressure drops, such as on the order of ten to twenty inches of water and even as low as one or two inches of water. One type of gas flow rate monitoring in which the apparatus A may be used, for example, is in conjunction with pollutant measurement or emission controls for environmental purposes. The apparatus A includes a housing H having a chamber C through which the gas being measured passes. A disk D rotatably mounted in chamber C has plural turbine blades or teeth T formed around the periphery of disk D to receive the impact of the gas entering chamber C through a nozzle N of an inlet I. A photoelectric circuit P directs light onto side portions of disk D so that reflective surfaces on disk D may reflect light in order that an electrical signal indicative of gas flow rate may be formed.

DISK AND NOZZLE CONSIDERATIONS

As has been set forth, the apparatus A is adapted to measure low gas flow rates, even at low pressure drops across the flow transducer. The structure of the disk D and its teeth T, the mounting of the disk D in the housing H, and also the location of the nozzle N with respect to the disk D have been found by Applicant to be significant in low gas flow rate and low pressure drop situations. Experiments have shown that the shape of a gas jet discharging from a nozzle is different for gases based on whether the pressure drop across the nozzle is above or below a critical value.

Since flow transducers according to the present invention necessarily have very low pressure drops for most applications (i.e., less than ten to twenty inches of water pressure), for the present invention, consideration is given only to jet shapes when the back pressure is less than twenty inches of water pressure. In this case, the jet would in usual cases issue as a cylindrical parallel stream, its surface being gradually retarded by the surrounding gas, so that a mixing zone is produced in which the velocity of the jet finally drops to that of the surrounding gas. However, with the present invention the structure and arrangement of disk D and nozzle N are such that this does not occur. For jet exit velocities from small round nozzles in the five to twenty feet/-second velocity range such as occuring in the present invention, FIG. 2 presents how impact force drops off as nozzle N is moved farther away from the bucket of a turbine blade of the disk D of FIG. 1.

Figure 2:
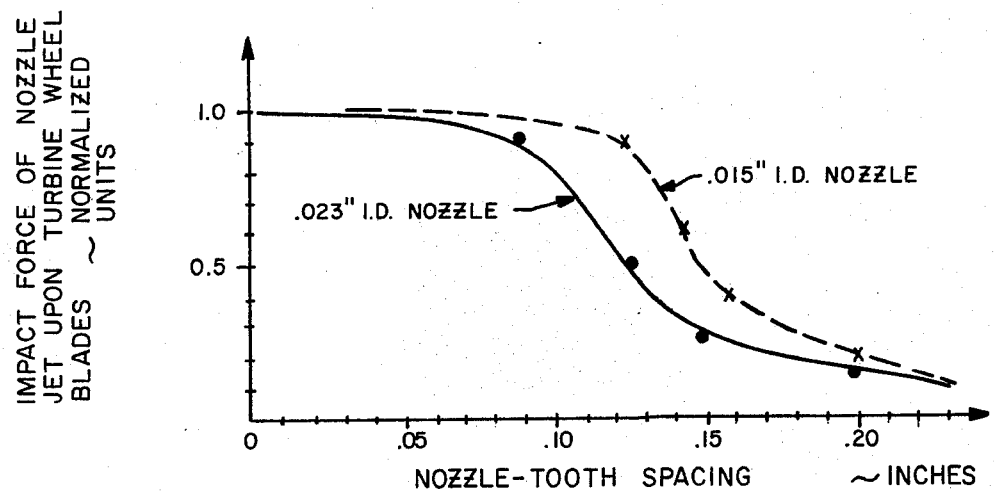
FIG. 2 is a graph of impact force as a function of nozzle spacing in the structure of FIG. 1 according to the present invention.

As can be seen from FIG. 2, with the present invention it has been found that the turbine wheel blades T of disk D must be located less than 0.10 inch apart in order not to significantly lose the beneficial impact force that the nozzle jet of gas puts upon the turbine wheel blade. According to the present invention, the blades T are spaced from each other in ten degree to twenty degree angular segments about the circumference of the disk D. Thus, for a typical disk D according to the present invention, such as a relatively large one having a 0.64 inch diameter disk D with twenty-four turbine blades T, the spacing is at 0.084 inch intervals which is a preferred spacing for a disk D of this example size, one which has been found to cause very little loss (about four percent) in impact force from the nozzle N. It should be understood that the foregoing dimensions are given by way of example, and that other dimensions may equally as well be used. As can be seen from FIG. 2, if the teeth T are spaced too far apart around the periphery of the disk D, nozzle velocity of gas exiting from nozzle N has been found by Applicant to be necessarily increased to overcome rotational friction resistance of the disk D axle bearings and maintain it rotating. However, an increase in gas nozzle velocity is undesirable, because it requires an increase in gas flow rate.

Considering the plurality of teeth T (FIG. 1) symmetrically spaced around the outer periphery of disk D, each has an impact surface 16, a top surface 18 and a trailing or back surface 20. The impact surface 16 is formed along a radial line extending from the center axle 22 of disk D. The surface area of impact surface 16 is of a size such that gas entering the chamber C at the lowest intended pressure and flow rate for the largest diameter nozzle N to be utilized moves the disk D sufficiently that the next subsequent impact surface 16 is presented. In addition, the impact surface 16 need only extend for a relatively small portion, on the order of ten percent, of the radius of disk D.

It is further to be noted that the nozzle N directs the incoming gas along a longitudinal axis indicated by a line 24 at an acute angle to the impact surface 16 rather than a perpendicular one. Applicant has found that this acute angle relationship between nozzle N and impact surface 16 offers advantages over a perpendicular one. In contrast with the present invention in prior paddle wheel designs having a perpendicular relationship between the inlet and the paddles, Applicant has found that portions of the stream of gas directed against the paddle impact surface flowed downwardly along the impact surface, giving rise to a Bernoulli effect and exerting a suctional force on the paddle wheel tending to draw the paddle wheel in a reverse direction from that of desired rotation. However, for acute angles of fifteen or so degrees for nozzle N in the present invention with respect to impact surface 16 as shown in FIG. 1, little loss in potential torque is noticed.

Figure 1A:
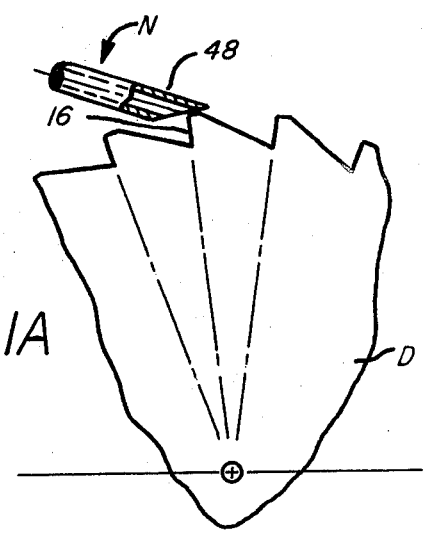
Figure 1B:
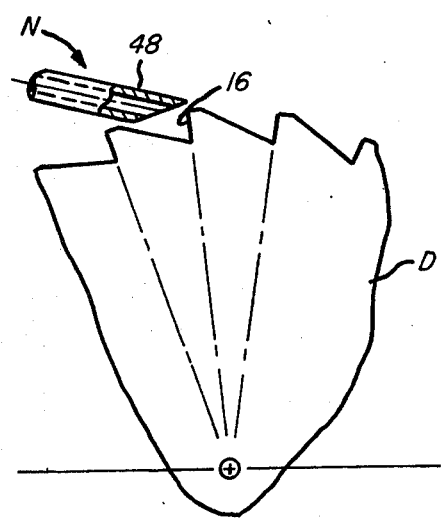
Figure 1C:
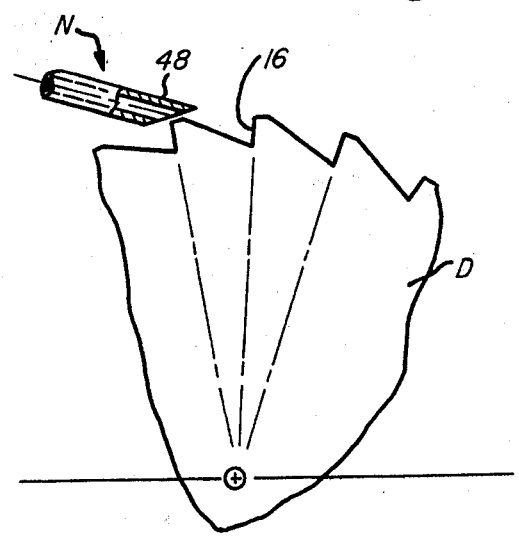
Figure 7:
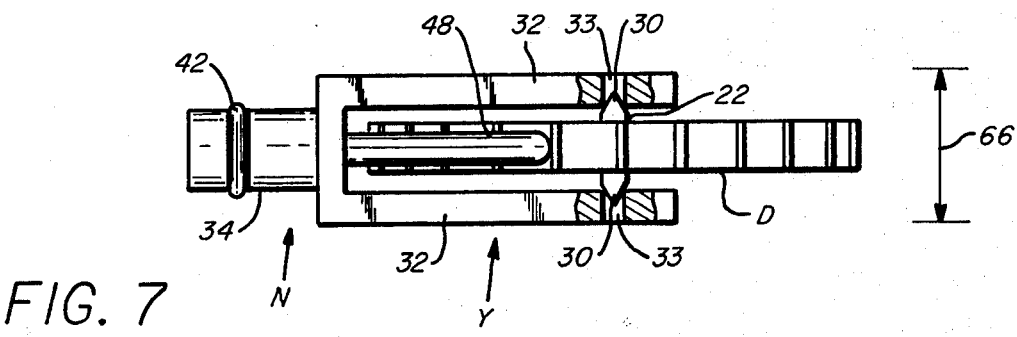
FIG. 7 is a side view of the mounting of the rotatable disk of FIGS. 1 and 4 according to the present invention.
Figure 3:
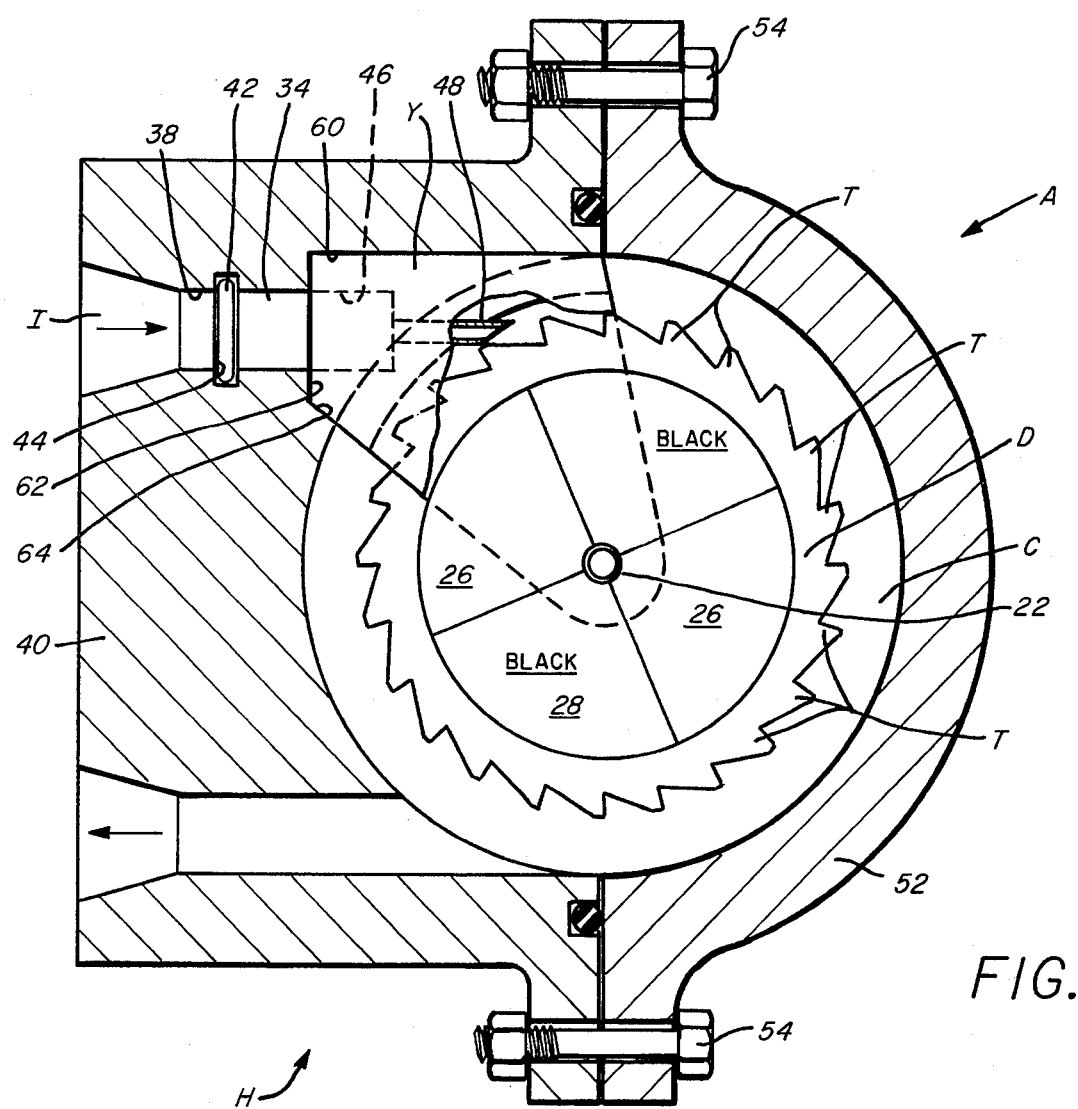
FIG. 3 is a top view, taken partly in cross-section, of an apparatus according to the present invention.

Another feature of the teeth T on disk D is the rake angle, or slope, of back surfaces 20 from a tangential line to the top surface 18. This rake angle is usually on the order of thirty degrees, although it may be less, such as twenty-five degrees or so. The rake angle of back surface 18 permits impact surface 16 to continue to receive the force of gas from nozzle N as the disk D rotates and moves the surface 16 from a partially exposed leading position (FIG. 1A) to a fully exposed position (FIG. 1B) to a partially exposed trailing position (FIG. 1C). Further, the gap between side surfaces 16 of disk D and a yoke Y (FIGS. 3 and 7) in which nozzle N is mounted are kept very, very small so that little of the incoming gas into the chamber C may escape sidewardly, thereby directing substantially the entire force of such incoming gas into causing rotation of the disk D, insuring the incoming gas imposes substantially continuous torque on the disk D. With the disk D and nozzle N according to the present invention built according to these considerations, it has been found that pressure of gas from nozzle N or each successively presented one of the impact surfaces 16 of the teeth T remains substantially constant until the succeeding tooth T is in position to receive the blast from the jet of the nozzle N.

Disk D should also be as thin as practical to reduce the overall weight, which is the major reason for frictional torque during the rotation of the disk D. For example, disk D may have a thickness of 0.03 inches (0.76 mm) although other thicknesses could also be used. The disk D is preferably of a lightweight material, such as a synthetic resin that is resistant to degradation by the types of gases flowing through the chamber C. An example of such a material is forty percent glass filled polyphenylene sulfide. On at least one side portion of disk D a suitable number of reflective surfaces or coatings 26 are formed or applied. Typically the remaining surfaces 28 on the disk D are non-reflective, either due to the material from which disk D is formed or due to non-reflective paint or similar coating. During rotation of the disk D, a light beam directed from photoelectric circuit P, in a manner to be set forth, is reflected during those times when the reflective surfaces 26 pass through the light beam, thereby producing a pulsing reflected light beam. This light beam is used in photoelectric circuit P to form an electrical signal indicative of gas flow rate through apparatus A.

The centrally disposed axle 22 (FIG. 7) of disk D has pivotal tips 30 of a suitable hardened metal, such as stainless steel, for supporting disk D in a rotatable movement in response to passage of gas through the chamber C. The yoke or bearing saddle Y has arms 32 disposed on each side of disk D to hold disk D in position in chamber C (FIG. 3), as well as to limit sideward flow of entering gas, as has been set forth. Arms 30 include V-shaped sapphire bearing surfaces 33 (FIG. 7) for receiving the tips 30 of the axle 22. The sapphire bearings 33 and matching stainless steel pivot tips 33 produce rotatable movement of the disk D with very low frictional losses.

NOZZLE ASSEMBLY

Nozzle assembly N is removably mounted in yoke Y so that different diameter nozzles may be substituted depending upon flow rate measurement requirements. The nozzle assembly N includes a cylindrical mounting sleeve 34 adapted to be mounted along a first portion of its length in a recess 38 formed in a body member 40 of the housing H adjacent the inlet I. An O-ring or other suitable seal 42 is fitted about this portion of sleeve 34 to fit into an annular space 44 in body member 40 adjacent recess 38 to seal the chamber C from the inlet I. The remaining or front portion of the mounting sleeve 34 is received into a recess 46 formed in the yoke Y adjacent the recess 38. The nozzle assembly N also includes a nozzle jet tube 48 which directs the incoming gas against the teeth T. The sleeve 34 is provided with a central hollow portion for passage of gas therethrough. As has been set forth above, different sizes of jet tubes 48 may be provided on the sleeve 34 to provide nozzle assemblies N of different sizes and flow capacities.

HOUSING

The housing H may be of any suitable configuration and generally includes the body member 40 and a cap or cover 52. The gas entering the chamber C through inlet I and nozzle N exits through an outlet O formed in body member B. The body member 40 and cover 52 are mounted together by bolts 54 or other suitable fastening means as shown to form the cavity C. A seal 56 is mounted between body member 40 and cover 52 to seal the chamber C. The seal 56 may be mounted in a groove 58 formed in body member 40 as shown, or one formed in cover 52 or in both, if desired.

The body member 40 has a yoke receiving pocket formed therein at surfaces 60, 62 and 64 adjacent the recess 38. Surfaces 60, 62 and 64 conform to coresponding surfaces on the yoke Y for receipt thereof in body member 40. Further, the width of the portions of chamber C in this portion of body member is substantially equal to the width of the yoke Y, indicated by an arrow 66 so that the yoke Y and nozzle assembly N are held firmly in place in the chamber C.

Figure 8:
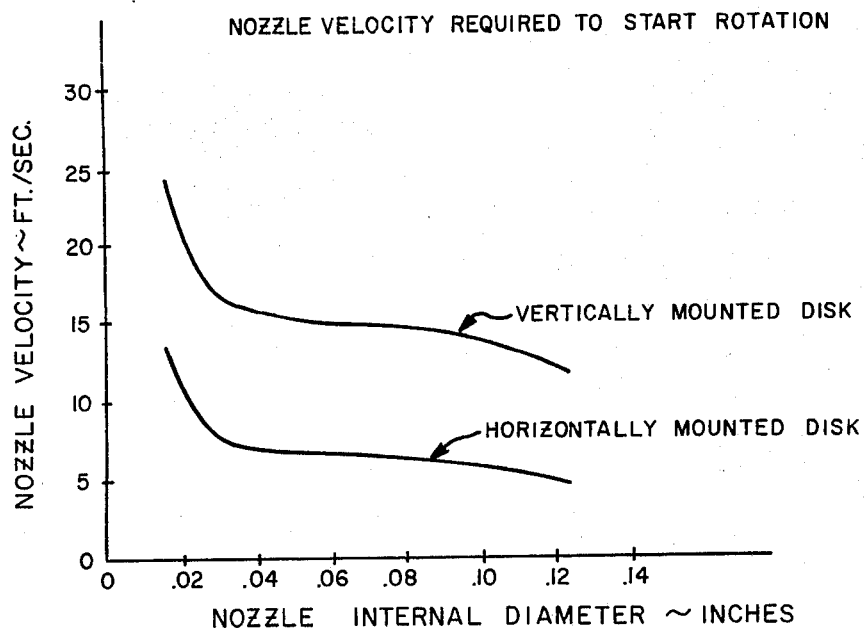
FIG. 8 is a graph illustrating gas velocity in a nozzle as a function of nozzle diameter in an apparatus according to the present invention.

Although in the preferred embodiment the disk D and apparatus A are positioned so that the disk D is rotatable about a vertical axis, it may be positioned so that the disk D is rotatable about a horizontal axis. In these latter situations, nozzle gas velocities for starting rotation of the disk D are greater, most likely due to less precise disk balance when mounted for rotation about a horizontal axis. FIG. 8 is a plot of nozzle gas velocity required to start disk rotation with the present invention as a function of nozzle internal diameter showing this phenomenon.

PHOTOELECTRIC CIRCUIT

Figure 5:
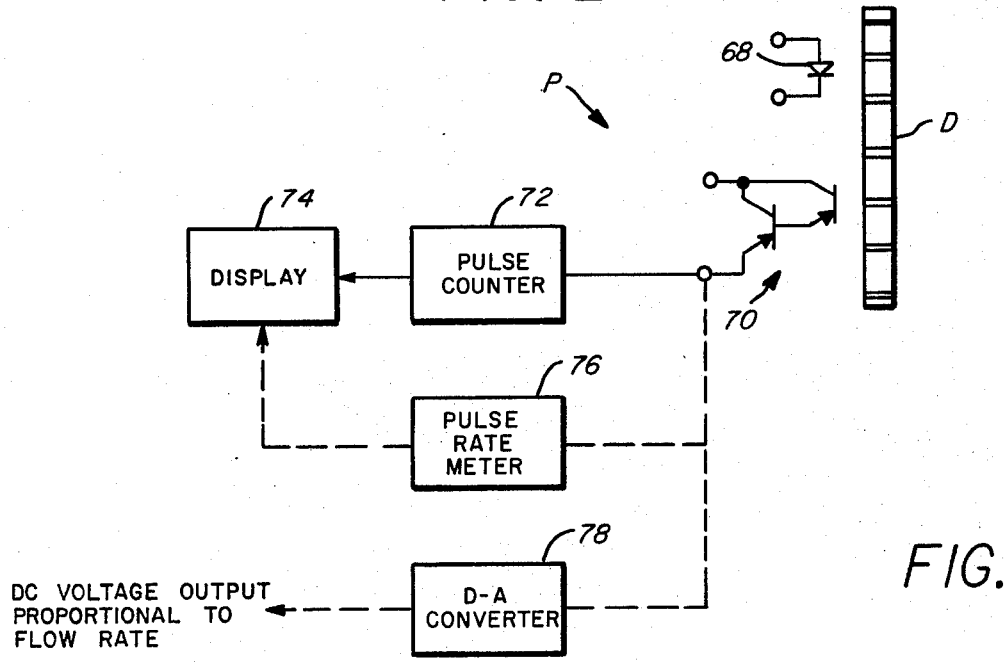
FIG. 5 is a schematic electrical circuit diagram of the apparatus of the present invention.
Figure 4:
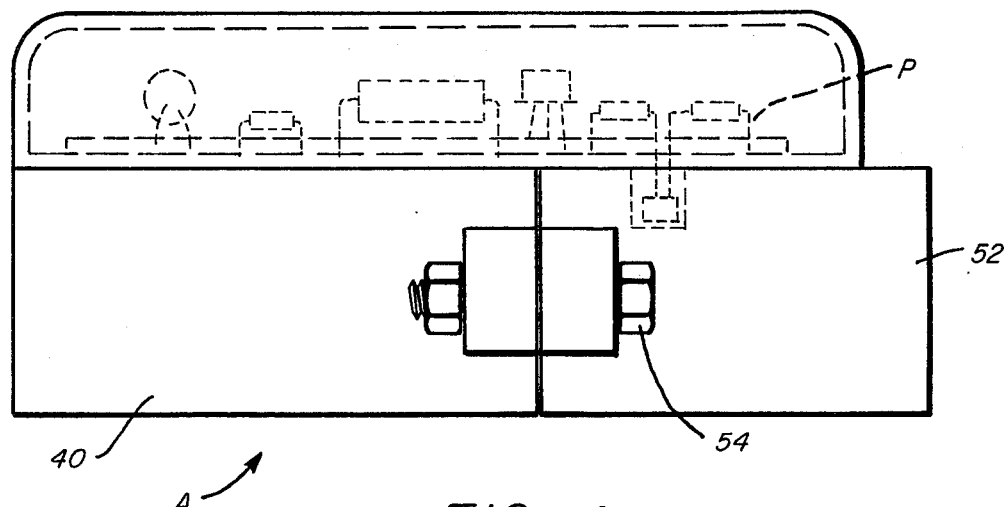
FIG. 4 is a side elevation view of the apparatus of FIG. 1.

Considering now the photoelectric circuit P (FIGS. 4 and 5) circuit means P includes light emitting diode (LED) 68, such as an infrared type, and a light receiving amplifying circuit, such as a photo-darlington transistor pair 70, to receive the reflected light and convert the sensed light to an electrical output signal. The light emitting diode 68 and the transistor pair 70 are located in close proximity to each other on a common side (FIG. 4) of the disk D. Further, light emitting diode 68 and transistor 70 are very closely positioned with respect to the side surfaces of disk D to minimize the length that light must travel in the chamber C. In this way, the flow rate of certain cloudy or semi-transparent gases may be measured, whereas in prior art structures which required transit of the light across the chamber this was unlikely to occur. If desired, light emitting diodes 68 and phototransistors 70 may be mounted in chamber C on both sides of disk D.

The electrical signal formed by the transistor pair 70 may be measured or monitored in several ways. For example, connected to a pulse counter 72 which counts the number of electrical pulses formed by transistor pair 70 in response to sensed light. The count formed in counter 72 may be provided as an input to display 74 for observation and monitoring. Alternatively, the output signals from transistor pair 70 may be connected to a pulse rate meter 76, as indicated in phantom in FIG. 5, which meters and displays the rate at which transistor pair 70 is forming electrical pulses. Further, the data pulses from transistor pair 70 may be converted to a direct current level in a D/A converter 78, if desired.

Figure 6:
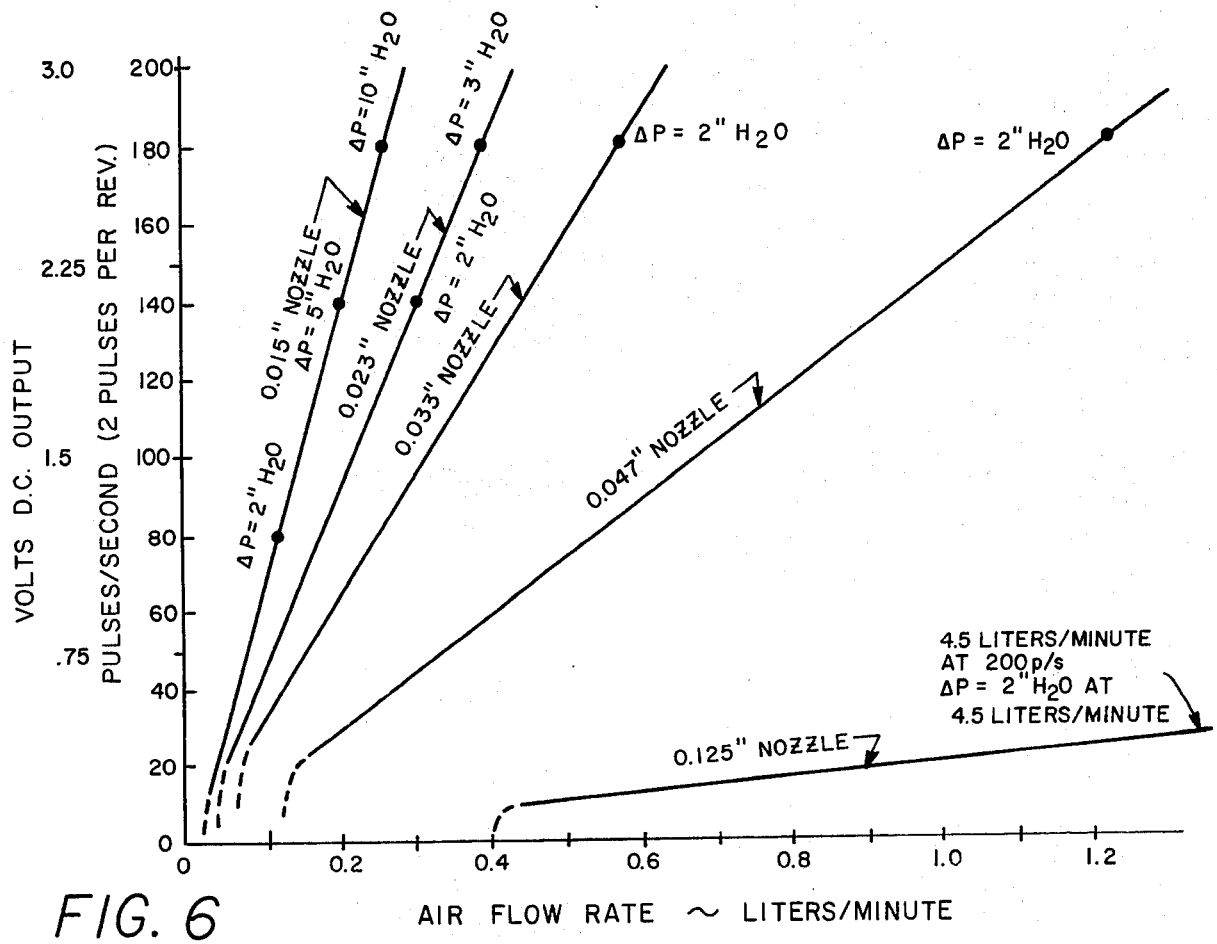
FIG. 6 is a graph of output voltages formed in the apparatus of the present invention as a function of flow rate for different sizes of nozzles.

The number or rate of electrical pulses formed in the photoelectric circuit P is representative of the rate of gas flow through the chamber C as indicated by the rate of rotation of the disk D. Specifically, the light emitting diode 68 directs light onto the side of spinning disk D. As reflective surfaces 26 pass through the light emitting diode 68, light is reflected to transistor pair 70. The amount of time that reflective surfaces 26 are present in front of and reflect light to transistor pair 70 is proportional to the relative speed of rotation of disk D and, therefore, is a measure of the gas flow rate. FIG. 6 demonstrates the linear relationship achieved with the present invention between the air flow rate and the light beam pulses per second from the reflective surfaces or, in effect, the output signal from transistor pair 70.

In operation of the present invention for measuring flow rates of a gas, the gas to be measured is directed through inlet I against the teeth T, to cause rotation of disk D. The reflective surfaces 26 formed on the side portion of disk D pass through light directed from the light emitting diode 68 as the disk D rotates, and the light reflected from the reflective surfaces 26 is received by transistor pair 70 forming an electrical output signal indicative of flow rate of gas through apparatus A.

The foregoing disclosure and description of the invention are illustrative and explanatory thereof, and various changes in the size, shape and materials, as well as in circuit components and connections and the details of the illustrated construction may be made without departing from the spirit of the invention.

I claim:

1. An apparatus for measuring low flow rates of gas at pressure drops in the order of twenty inches of water pressure or less, and at flow rates in the order of twenty milliliters per minute to ten thousand milliliters per minute, comprising:
   a housing having a chamber through which the gas to be measured passes;
   a disk rotatably mounted about a center thereof in said chamber;
   said disk having reaction turbine blades formed around the entire periphery thereof, said blades located on a spacing of ten to twenty degree segments about said central axis of said disk, each blade having an impact surface thereon for receiving the impact of said gas entering said chamber;
   nozzle means mounted in said housing in a plane substantially parallel to the plane wherein said disk is disposed for directing substantially the entire flow of the gas entering said chamber sequentially against individual ones of said impact surfaces at velocities between five to twenty feet per second, thereby presenting the adjacent impact surface;
   photoelectric circuit means for directing light onto side portions of said disk and measuring relative movement thereof in response to impact of the gas against said impact surfaces; and
   said disk further having reflecting surfaces formed on side portions thereof for reflecting light directed from said photoelectric circuit means.

2. The apparatus of claim 1 including said reaction turbine blades having a trailing surface formed at an acute angle of about 30 degrees to a tangent of said disk to permit said impact surfaces to continue to receive gas from said nozzle during movement away therefrom.

3. The apparatus of claim 1 wherein:
   said nozzle means is mounted at an acute angle with respect to said impact surfaces to direct the gas thereagainst.

4. The apparatus of claim 1, wherein said impact surfaces are formed along a radial line extending from said center of said disk.

5. The apparatus of claim 1, wherein said impact surfaces are formed along a portion of a radial line extending from said center of said disk.

6. The apparatus of claim 1 including said disk having a centrally disposed axle having a pivotal tip for supporting said disk for rotatable movement and further including removable carriage means for mounting said disk in said chamber, said carriage means having bearing surfaces for rotatably mounting said axle.

7. The apparatus of claim 6 including said carriage means having said nozzle means mounted therewith for directing the gas against said impact surface on each of said blades on said disk.

8. The apparatus of claim 1, wherein:
   said nozzle means is interchangeable in said housing thereby allowing a variation in the range of flow rates to be measured.

9. The apparatus of claim 1 wherein:
   said reflective surfaces extend to an angle substantially ninety degrees on the side of said disk, said reflective surfaces being equally spaced on said disk.

10. A rotatable apparatus for measuring low gas flow rates in the order of twenty milliliters per minute to ten thousand milliliters per minute at pressure drops in the order of twenty inches of water pressure or less in a flow meter of the type which includes a housing having a chamber through which the gas to be measured passes and a photoelectric circuit for measuring relative movement of said apparatus as the gas passes through the housing, said apparatus comprising:

a disk adapted to be rotatably mounted in the chamber;

plural reaction turbine blades formed around the entire periphery of said disk for receiving the impact of substantially the entire flow of gas entering the chamber in a direction parallel to the plane wherein said disk is disposed sequentially against individual ones of said blades thereby presenting the adjacent blade; and, reflective surfaces formed on portions of said disk for reflecting light directed from the photoelectric circuit.

11. The apparatus of claim 10 including said turbine blades having a trailing surface formed at an acute angle to a tangent of said disk to permit said turbine blades to continue to receive gas during rotation of said disk.

12. The apparatus of claim 11, wherein said turbine blades are formed along a radial line extending from said center of said disk.

13. The apparatus of claim 11, wherein said impact surfaces are formed along a portion of a radial line extending from said center of said disk.

14. The apparatus of claim 10 wherein:

said reflective surfaces extend to an angle substantially ninety degrees on the side of said disk, said reflective surfaces being equally spaced on said disk.

15. A rotatable disk assembly for measuring low gas flow rates in a flow meter of the type which includes a housing having a chamber through which the gas to be measured passes and a photoelectric circuit for forming an output proportional to the gas flow rate, said assembly comprising:

a disk having a centrally disposed axle having a pivotal tip to support said disk for rotatable movement;

turbine blades formed around the entire periphery of said disk for receiving substantially the entire flow of gas entering the chamber in a direction parallel to the plane wherein said disk is disposed on a spacing of ten to twenty degree segments about said central axis of said disk;

reflective surfaces formed on portions of said disk for reflecting light directed from the photoelectric circuit;

removable carriage means for mounting said disk in the chamber;

said carriage means having bearing surfaces for rotatably mounting said axle; and said carriage means having a removably mounted nozzle assembly for directing the impact of the gas sequentially against individual ones of said turbine blades at a controlled location, thereby presenting the adjacent turbine blade, and permitting nozzle assemblies of varying sizes to be mounted in said carriage means to effectively vary the sensitivity of the assembly to gas flows.

16. The assembly of claim 15, wherein:

said disk is 0.03 inches thick or less.

17. The assembly of claim 15, wherein:

said blades extend to a height of approximately 10% of the radius of said disk.

18. The assembly of claim 15 wherein:

said reflective surfaces extend to an angle substantially ninety degrees on the side of said disk, said reflective surfaces being equally spaced on said disk.

* * * * *